United States Patent [19]

Guenter

[11] 4,374,820
[45] Feb. 22, 1983

[54] MANUFACTURE OF $H_2O_2$
[75] Inventor: Thomas E. Guenter, Memphis, Tenn.
[73] Assignee: E. I. Du Pont de Nemours and Company, Wilmington, Del.
[21] Appl. No.: 288,005
[22] Filed: Jul. 29, 1981
[51] Int. Cl.³ .............................................. C01B 15/02
[52] U.S. Cl. ..................................... 423/588; 423/589; 423/590
[58] Field of Search ........................ 423/588, 589, 590
[56] References Cited

U.S. PATENT DOCUMENTS 2,657,980 11/1953 Sprauer ................................ 423/590
2,689,169  9/1954 Hinegardner ........................ 423/590
2,966,398 12/1960 Jenney ................................. 423/589
3,009,782 11/1961 Porter ................................... 423/589
3,423,176  1/1969 Kabisch et al. ...................... 423/588
4,336,241  6/1982 Diamond et al. .................... 423/588

Primary Examiner—O. R. Vertiz
Assistant Examiner—Wayne A. Langel

[57] ABSTRACT

An alkylanthraquinone working solution as used in the manufacture of hydrogen peroxide, in the oxidized form is cooled to from 20° to 40° C. and fed to a slurry type catalytic hydrogenator maintained at from 38° to 60° C., and 10 to 100 psig. From 10 to 90% of the catalyst free hydrogenated working solution is cooled to from 20° to 40° C. and recycled to the hydrogenator.

7 Claims, 1 Drawing Figure

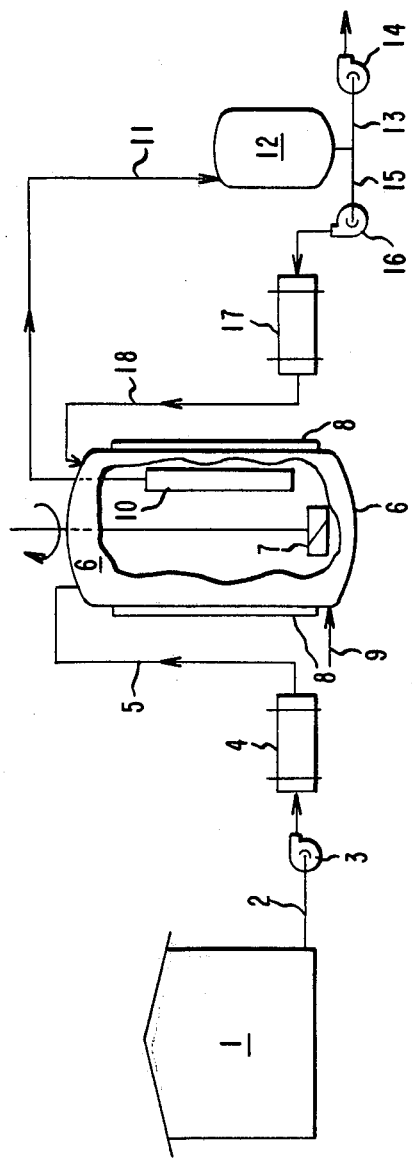

MANUFACTURE OF H₂O₂

BACKGROUND OF THE INVENTION

1. Field of the Invention

The present invention relates to the manufacture of hydrogen peroxide by the well known anthraquinone process.

2. Prior Art

U.S. Pat. No. 3,009,782 describes the production of hydrogen peroxide by the anthraquinone working solution process using a fixed bed hydrogenation unit with recycle cooling of the hydrogenation unit.

U.S. Pat. No. 2,966,398, discloses the production of hydrogen peroxide by the anthraquinone working solution process wherein the hydroquinone form of the working solution on leaving the hydrogenator is cooled sufficiently to form hydroquinone crystals prior to being oxygenated.

SUMMARY OF THE INVENTION

The present invention relates to the reduction of an alkylated anthraquinone working solution in a slurry catalyst hydrogenator to produce the hydroquinone form of the working solution wherein a portion of the product hydrogenated alkylanthraquinone working solution is recycled to the hydrogenation reactor in order to achieve improved temperature control. Uniform hydrogenator temperature is maintained by means of a stirrer and/or gas agitation which also serve to maintain catalyst in suspension. The process eliminates the need to cool the anthraquinone working solution as close to the precipitation point of the alkylanthraquinone as is presently the case without recycle cooling. Another advantage of the process is that a high degree of hydrogenation can be used, while maintaining a low hydrogenation temperature.

BRIEF DESCRIPTION OF THE DRAWING

The drawing is a flow diagram of the process of the present invention.

DETAILED DESCRIPTION OF THE DRAWING

The alkylanthraquinone working solution is fed from hold tank 1 through line 2 to pump 3 to precooler 4 where it is cooled. From precooler 4 the working solution is fed through line 5 to hydrogenator 6. Hydrogenator 6 is equipped with stirrer 7 and may be equipped with a cooling jacket 8. Hydrogen is fed to hydrogenator 6 by means of line 9. The hydrogenated working solution is separated from the catalyst in the hydrogenator by immersed filters 10 and fed through line 11 to primary filter tank 12. The working solution entering filter tank 12 is essentially free of catalyst. Part of the effluent from filter tank 12 is fed through line 13 to pump 14 and through additional cleanup filters (not shown) to the oxidation step (not shown) where the hydrogenated alkylanthraquinone working solution is oxidized to produce hydrogen peroxide. The remaining working solution from filter tank 12 is fed through line 15 to pump 16 and through recycle cooler 17 to be returned through line 18 to hydrogenator 6.

DETAILED DESCRIPTION

Anthraquinone processes for hydrogen peroxide production use quinone species dissolved in solvents to form a working solution. Such solutions exhibit quinone precipitation or viscosity—increase properties as temperature is reduced. In commercial processes it is desirable to use high quinone concentrations in the working solution. Relatively high quinone precipitation temperatures are characteristic of such solutions.

Furthermore, in commercial processes it is desirable to operate at high degree of hydrogenation (high titer) of the quinones which are in solution. As titer increases, heat release increases during hydrogenation since the hydrogenation reaction is exothermic.

However, low temperature is desired to carry out the hydrogenator reaction because undesired byproducts form at elevated temperatures.

In conventional hydrogenation systems the heat from the hydrogenation reaction results in the so-called adiabatic temperature rise of the reactor feed working solution from a precooled state to the hydrogenation temperature. Even though jacket cooling of the hydrogenator is frequently used it can remove only a small amount of the heat generated.

Since quinone precipitation establishes a lower cooled working solution temperature limit for the reactor feed working solution, the adiabatic temperature rise cooling method using only reactor feed solution either results in high reactor temperature if high titer is used with its high heat release, or limits titer and process capacity in order to limit heat release if a constraint is established on reactor temperature.

It is desirable to operate hydrogenation systems at conditions where the differential between reactor temperature and precooled working solution temperature which is obtainable without quinone precipitation is less than the adiabatic rise temperature differential of the working solution corresponding to the titer desired in the system.

Various means have been studied to introduce additional cooling capacity to a high capacity (titer) working solution reactor. The method of recycling working solution along with suspended, supported catalyst through a cooler returning to the reactor has not been introduced to commercial practice due to the tendency of the catalyst to undergo attrition in the recycle cooling circuit.

Cooling apparatus internal to the hydrogenator or externally jacketing the hydrogenator do not render as much cooling advantage as needed due to inherently low cooling coefficients, limited cooling area, complex construction or combinations of these disadvantages.

Introduction of additional cooling, by recycling a portion of the working solution, essentially free of catalyst, through cooling and returning to the hydrogenator requires that the total flow of working solution leaving the hydrogenator be larger (typically approximately double) than the flow of working solution which goes forward to oxidation.

The ability of the immersed filters to sustain flows well in excess of the flow to oxidation has generally been regarded as not possible in conventional systems. Indeed conventional systems are, at times, hard pressed to deliver only forward flow to oxidation through the immersed filters.

It has now been found that through adjustment of catalyst characteristics and hydrogenation conditions adequate flow capability through the immersed filters can be realized to satisfy both forward and recycle flow rates.

One catalyst adjustment which can be made to enhance immersed filter flow is to use a catalyst support of a larger particle size than is used in conventional systems. Another catalyst adjustment which can be made to enhance immersed filter flow is to reduce catalyst concentration in the slurry in the hydrogenator. However, both of the foregoing catalyst adjustments, according to conventional exceptions, move in the direction of reducing the reactivity of the hydrogenator, when in fact sustained or increased reactivity is required to achieve reaction rates required by a high capacity (titer) system.

For these reasons is is surprising that adequate filterability of a catalyst could be achieved, in conjunction with adequate catalytic hydrogenation activity, to enable recycle cooling using catalyst-free working solution.

So-called quinone processes for hydrogen peroxide involve a solution of an alkylanthraquinone working compound which can be alternately reduced and oxidized to produce hydrogen peroxide in a suitable solvent. Suitable alkylanthraquinone working compounds include 2-ethylanthraquinone, 2-t-butylanthraquinone, 2-sec-amylanthraquinone, 2-isopropylanthraquinone, 2-sec-butylanthraquinone, 2-t-amylanthraquinone and 1,3-dimethylanthraquinone and mixtures of these quinones and their so-called tetrahydroquinone derivatives. One such working compound is a blend of 2-t-butylanthraquinone and sec-amylanthraquinone.

The working compounds are dissolved in at least one organic solvent to form the anthraquinone working solution. Two or more mixed organic solvents may be used to enhance the solubility of the anthraquinone working compound in both its hydrogenated form and in its oxidized form. Many such solvents and mixtures of solvents are known to be useful for dissolving the working compounds in both hydrogenation and oxidation stages. Solvents consisting of mixtures of compounds such as benzene, toluene, alkylnaphthalene and the like with an alcohol and the like have been used for this purpose. Other useful solvent mixtures for use in this process include alkylbenzenes containing 9-11 carbon atoms, trialkylphosphate esters such as tris (2-ethylhexyl) phosphate and tetraalkyl ureas. Another useful solvent system is alkylated benzenes with diisobutyl carbinol.

Generally the working solution entering the hydrogenator will contain alkylanthraquinones in from 90 to 100% oxidized state. Generally the working solution leaving the hydrogenator will contain alkyl anthraquinones in the 30 to 70% hydrogenated form with from 50 to 60% in the hydrogenated form being preferred.

Generally the residence time of the working solution in the hydrogenator will be from 10 to 50 minutes.

Generally the hydrogenator is operated at from 38° to 60° C. with from 40° to 45° C. being the preferred range.

Generally the hydrogenator will be operated at from 10 to 100 psig (69 to 690 kPa) with from 15 to 50 psig (103 to 344 kPa) being the preferred range.

The hydrogenator uses catalyst slurried in working solution. The slurry hydrogenation catalyst of the present invention process is typically of small particle size, with median particle size of 70 to 200 microns, contains less than 10% of particles smaller than 50 microns and a surface area of 100 to 350 $m^2/g$ and is kept suspended in the working solution in the hydrogenator. Suitable hydrogenation catalysts include supported palladium, supported platinum and supported nickel. The working solution and hydrogen are passed through the hydrogenator continuously. Agitation in the hydrogenator can be achieved in several ways such as by means of a stirrer or by passing a stream of gas through the hydrogenator in an amount sufficient to create turbulence throughout the working solution containing the suspended catalyst.

The preferred catalyst is a supported palladium. Suitable support materials include alumina, titania and silica. Generally the catalyst will contain from 0.1 to 2.0 wt % palladium with from 0.5 to 1 wt % being the preferred range. Generally the working solution in the hydrogenator will contain from 2 to 15 wt % catalyst, with 4 to 8 wt % being the preferred range.

The oxidized form of the working solution fed to the reactor is precooled to from 20° to 40° C. and preferably 32° to 38° C. prior to being fed to the hydrogenator.

The working solution exiting from the hydrogenator passes through filters immersed in the hydrogenator. A wide variety of filters can be used such as fabric filters and porous metal filters. The filter medium is selected to retain essentially all the catalyst in the hydrogenator.

The hydrogenated working solution is fed to a filter feed tank. On leaving the filter feed tank the working solution is divided into two streams; one stream is sent to oxidation to produce hydrogen peroxide. The other stream is cooled to from 20° to 40° C. and preferably from 32° to 38° C. and recycled to the hydrogenator. Generally from 10 to 90% and preferably from 25 to 70% of the working solution exiting the filter feed tank is recycled to the hydrogenator.

As compared with a conventional slurry catalyst hydrogenation process at a given titer or degree of hydrogenation the process of the present invention permits cooled working solution temperatures in the precooler which are several degrees warmer than required without a cooled recycle stream. It is not necessary to cool any of the working solution to below about 35° C. instead of the usual precooler temperature below 30° C. while yet maintaining a hydrogenator temperature of 45° C. or lower. Nor is it necessary to cool recycle hydrogenated working solution below the precipitation temperature of any of its components. With such a more favorable temperature profile in an operating system a higher quinone concentration working solution may be used than in a conventional system because the amount of alkylanthraquinone in the working solution is limited by its solubility at the lowest temperature experienced by the working solution in the overall cycle. The use of a higher quinone concentration working solution allows producing more hydrogen peroxide in a given size unit. So-called supercooling can be exhibited below rigorously determined quinone precipitation temperatures on working solutions without incurring quinone precipitation; nonetheless lower cooling temperature limits exhibit themselves whether such temperatures correspond to rigorously determined precipitation temperatures or are supercooled temperatures below precipitation temperatures.

Concurrently or alternatively to enjoying warmer precooler temperatures, the process of the present invention can be operated at a lower reactor temperature than a conventional process hydrogenator at a given titer. Lower reaction temperatures sustain high productivity while minimizing working solution byproducts formation which occurs as hydrogenation reaction temperatures increase.

Alternatively, or concurrently with increasing the quinone concentration and degree of hydrogenation of the working solution a less expensive though less soluble alkylanthraquinone may be used. Thus ethylanthraquinone or t-butylanthraquinone may be substituted for a more expensive, more soluble alkylanthraquinone such as 2-sec-amylanthraquinone.

Yet another advantage of using a cooled recycle stream of working solution is to permit using inexpensive cooling water sources such as from cooling towers rather than more costly lower temperature sources. It should be pointed out that while small amounts of heat can be removed by reactor jacket cooling, the quantity is minimal and can be viewed as playing a minor role in the system.

EXAMPLE

A working solution containing 13 wt % 2-t-butylanthraquinone including its tetrahydro derivative, 7 wt % 2-sec-amylanthraquinone including its tetrahydro derivative, 47 wt % mixed alkylbenzenes and 23 wt % diisobutyl carbinol is fed from a hold tank to a precooler, and cooled to 35.2° C., and fed to an 8000 gallon (36.4 m$^3$) hydrogenator fitted with a cooling jacket which hydrogenator is maintained at 45° C. The hydrogenator is maintained at 20 psig (138 kPa) with hydrogen and nitrogen. The hydrogenator contains 6% by weight of palladium on alumina catalyst (0.6% Pd.). The alumina had a median particle size of 120 microns with less than 0.2% of the particles having a size less than 50 microns. The hydrogenator is fitted with four immersed filters which retain slurried catalyst within the hydrogenator and through which the hydrogenated working solution is removed and fed to a filter feed tank. At this point the alkylanthraquinones in the working solution are 50–55% in the hydrogenated form, or a degree of hydrogenation of 30 lb mols per 10,000 gal (0.36 Kg mols/m$^3$). On leaving the filter feed tank, 67% of the working solution is sent to cleanup filters and to the oxidizer and 33% of the working solution is recycled to the hydrogenator. The recycle stream is cooled to 35.8° C. prior to being recycled to the hydrogenator.

I claim:

1. A process of hydrogenating an alkylanthraquinone working solution comprising feeding an alkylanthraquinone working solution in the oxygenated form at a temperature of from 20° to 40° C. to a hydrogenator containing a slurry of supported hydrogenation catalyst which is supported palladium, supported platinum or supported nickel having a median particle size of from 70 to 200 microns and less than 10% by weight particles less than 50 microns in diameter, the working solution in the hydrogenerator being maintained at from 38° to 60° C., and containing from 2 to 15% catalyst maintaining the pressure in the hydrogenator at from about 10 to about 100 psig, removing hydrogenated working solution from the hydrogenator through immersed filters which retain essentially all the catalyst in the hydrogenerator, dividing the hydrogenated working solution into a recycle stream which comprises from 10 to 90 percent of the hydrogenated working solution and a remaining stream which is to be oxidized, cooling the recycle stream to from 20° to 40° C. and recycling the cooled stream to the hydrogenator.

2. The process of claim 1 wherein the catalyst is palladium supported on alumina, silica or titania, said catalyst having a surface area of from 100 to 350 m$^2$/g.

3. The process of claim 2 wherein from 30 to 70% of alkylanthraquinones leaving the hydrogenator are in the hydrogenated state.

4. The process of claim 3 wherein from 25 to 70% of the working solution is cooled and recycled to the hydrogenator.

5. The process of claim 4 wherein the hydrogenator is operated at from about 15 to about 50 psig.

6. The process of claim 5 wherein the hydrogenator is maintained at from 40° to 45° C.

7. The process of claim 6 wherein from 50 to 60% of the alkylanthraquinones leaving the hydrogenator are in the hydrogenated state.

* * * * *